United States Patent [19]

Chernega et al.

[11] Patent Number: 4,963,209
[45] Date of Patent: Oct. 16, 1990

[54] METHOD FOR MAKING STRETCHED SURFACE RECORDING DISK

[75] Inventors: John G. Chernega, Stillwater; John A. Martens, Lino Lakes Township, Anoka County; Felix P. Lau, Woodbury; Leslie M. Milner, St. Paul, all of Minn.

[73] Assignee: Minnesota Mining and Manufacturing Company, St. Paul, Minn.

[21] Appl. No.: 317,817

[22] Filed: Mar. 1, 1989

Related U.S. Application Data

[60] Division of Ser. No. 69,328, Jul. 2, 1987, Pat. No. 4,835,647, which is a continuation of Ser. No. 684,942, Dec. 21, 1984, abandoned.

[51] Int. Cl.$^5$ .................... B32B 31/00; G11B 5/82; G11B 5/66; G11B 5/70
[52] U.S. Cl. .................. 156/160; 156/275.3; 156/275.7; 264/291; 360/135; 428/694; 428/900
[58] Field of Search .............. 156/160, 163, 229, 297, 156/212, 275.5, 275.7, 275.1, 275.3, 292, 295, 299, 73.1; 428/63–65, 694, 900, 910; 360/133, 135; 264/1.3, 106, 291, 346

[56] References Cited

U.S. PATENT DOCUMENTS

| | | | |
|---|---|---|---|
| 3,130,110 | 4/1964 | Schmidt | 161/42 |
| 3,212,075 | 10/1965 | Damereau et al. | 340/174.1 |
| 3,373,413 | 3/1968 | Treseder | 340/174.1 |
| 3,537,083 | 10/1970 | Voth | 340/174.1 |
| 3,599,226 | 8/1971 | Lips | 346/74 |
| 3,805,292 | 4/1974 | Hashiguchi et al. | 360/135 |
| 4,105,118 | 8/1978 | Williams, Jr. et al. | 156/275.5 |
| 4,166,622 | 9/1979 | Rager | 274/1 |
| 4,249,011 | 2/1981 | Wendling | 548/312 |
| 4,306,954 | 12/1981 | Wendling et al. | 204/159 |
| 4,365,257 | 12/1982 | Gerfast | 346/135 |
| 4,560,617 | 12/1985 | Nishimatsu et al. | 428/423.1 |
| 4,573,097 | 2/1986 | Pastor et al. | 360/135 |
| 4,623,570 | 12/1986 | Alexander et al. | 360/135 |
| 4,625,384 | 12/1986 | Gerfast | 29/448 |
| 4,631,609 | 12/1986 | Erickson et al. | 360/135 |
| 4,670,072 | 6/1987 | Pastor et al. | 156/73.1 |
| 4,729,805 | 3/1988 | Alexander et al. | 156/160 |

FOREIGN PATENT DOCUMENTS

| | | |
|---|---|---|
| 145200 | 6/1985 | European Pat. Off. . |
| 2342890 | 3/1974 | Fed. Rep. of Germany . |
| 3418907 | 11/1984 | Fed. Rep. of Germany . |
| 2025433 | 1/1980 | United Kingdom . |

OTHER PUBLICATIONS

Senich, G. A., and Florin, R. E., "Radiation Curing of Coatings", *Journal of Macromolecular Science*, 1984, pp. 239–241, 248–257, 276–291.
Komp, J. T., and Mattingly, G. S., *Radiation Processing*, K & N Publications, Inc., Louisville, Kentucky, 1976, pp. 37–51.
3M Advertisement entitled, "3M Stretched Disks".
Klein, A. F., "Electron Beam Processors for Magnetic Media Manufacturing", May 25–27, 1983, p. 5.
Irving Skeist, Editor, *Handbook of Adhesives*, 2d Ed., Van Nostrand Reinhold Company, Cincinnati, Ohio, 1977, pp. 8, 569–570.

Primary Examiner—Robert A. Dawson
Assistant Examiner—Gregory J. Wilber
Attorney, Agent, or Firm—Donald M. Sell; Walter N. Kirn; David B. Kagan

[57] ABSTRACT

Stretched surface recording disk (SSR) 10 comprising an annular support 12 having raised annular ridges 28 and 42 at its inside and outside diameters 22 and 30 with a base portion 24 in between the two ridges, and an annular recording medium film 14 held in radial tension and stretched across the base portion by adhering the film to attachment surfaces 48 and 36 near the inside and outside diameters respectively. The bond between the recording medium film and the support at the inner and outer attachment surfaces is formed by an electron beam cured adhesive such as a mixture of hydantoin hexacrylate and dimethylacrylamide. By manufacturing the stretched surface recording disks with the e-beam process, significantly less time is required to adhere each stretched recording medium to its support, and the quality of the bond between the support and recording medium film is improved. SSR are capable of higher bit density than floppy disks of equivalent surface area and are not as sensitive to contact between the media and a flying magnetic head ("head crashes") as rigid disks.

3 Claims, 4 Drawing Sheets

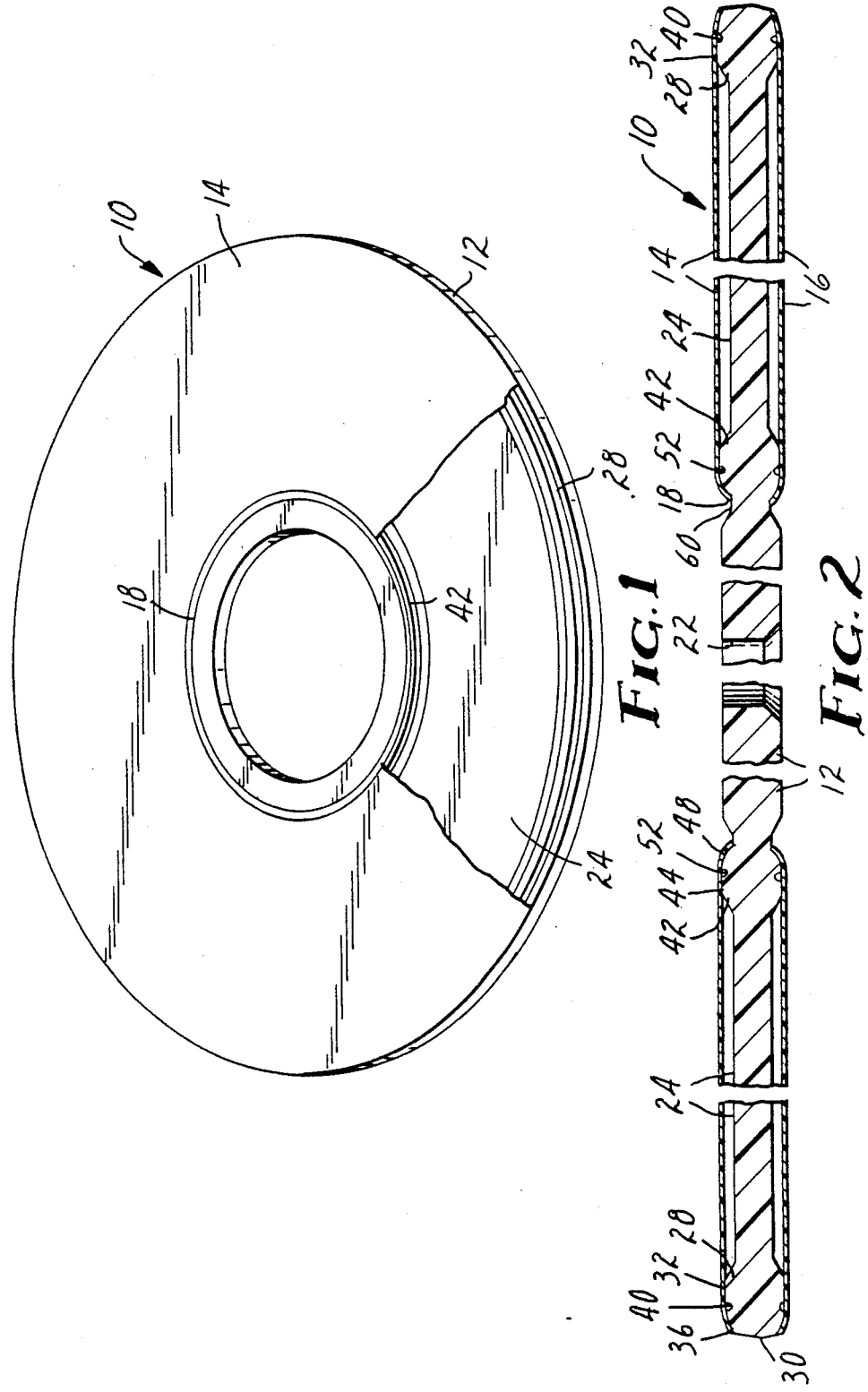

METHOD FOR MAKING STRETCHED SURFACE RECORDING DISK

"This application is a division of Application Ser. No. 07/069,328, Pat. No. 4,835,647 filed July 2, 1987 which is a continuation of Ser. No. 684,942, abandoned filed Dec. 21, 1984."

TECHNICAL FIELD

This invention relates to magnetic recording media, particularly flexible magnetic recording sheets stretched across the major surface of a disk-shaped support to provide a planar recording surface. The invention further relates to the preparation of double-sided disks with flexible magnetic recording film stretched across both sides of the plastic disk-shaped support.

BACKGROUND

Stretched surface recording disks (SSR) generally consist of a rigid, circular support and a thin polymer film suitably attached to the periphery of the support. The disk configuration allows random access to different portions of the recorded information, since all the information is available on a single plane, thus overcoming the main shortcoming of linear tape systems in which information is located in widely separated portions of the tape requiring relatively large amounts of time in unwinding and rewinding the tape for access. SSR can be made two-sided and they can be stacked to allow random access to information on multiple surfaces.

SSR are shown in U.S. Pat. No. 2,662,804 (Hutton); U.S. Pat. No. 3,130,110 (Schmidt); U.S. Pat. No. 3,336,583 (Comstock); and U.S. Pat. No. 3,488,646 (Sugaya). The development of SSR has progressed over the years from a rather simple configuration described in U.S. Pat. No. 3,373,413 (Treseder) in which a film was stretched and clamped between two circular rings, to a dish-shaped support to which a stretched film was attached at the periphery as illustrated by U.S. Pat. No. 3,509,274. Subsequently, U.S. Pat. No. 3,537,083 introduced the concept of bonding the film at the center of the support in addition to the support periphery, and U.S. Pat. No. 3,599,226 described an SSR which included two stretched film surfaces, one on either side of the support, which were attached at the periphery and near the center of the support.

U.S. Pat. No. 4,328,607 shows a drum head-like recording medium wherein the recording sheet has a metal foil backing.

SSR are superior to floppy disks in that a pressure-pad is not required, and the recording surface has substantially the same dimensional stability as the relatively massive base to which it is attached. In addition, the SSR provides a flat recording surface which may be deformed slightly to conform to a transducer head and irregularities in the surface of the head.

Although the patents described above have illustrated the general configuration and certain desirable features of SSR, practical problems remain as impediments to the mass production and general acceptance of SSR. These include the problem of economically and reliably attaching the very thin recording medium film to a relatively thick support, ensuring that the film remains at desired tension and planar with respect to the support.

The bonding of the magnetic recording sheet to the support of an SSR should satisfy the following criteria: a. high shear strength to withstand the tension of the stretched medium; b. minimal creep between recording medium film and support to maintain data track stability; c. smooth bonding surface to provide a smooth recording surface; and d. short setting time to allow for high production volume.

Various means have been examined for bonding magnetic recording media film, the underside of which is typically polyethelyene terephthalate, to supports of various materials (i.e. metals, plastics, composites). Pressure sensitive adhesives generally do not meet the shear and creep requirements. Thermoplastic adhesives require heat for bonding and may have viscosities which are too high to give a smooth bond surface. Thermosets (e.g., cyanoacrylate or epoxy adhesives) have setting times which are difficult to control.

DISCLOSURE OF INVENTION

A means has been found for attachment of a recording medium film which has been stretched taut to a rigid support using acrylic polymers, such as hydantoin hexacrylate, as the adhesive and curing that adhesive by means of ionizing radiation. This process avoids elevated temperatures, long curing cycles and the use of solvents in large amounts which could detrimentally affect magnetic media or support properties, while it provides fast, secure, reliable bonding.

The invention is summarized as a stretched surface recording disk comprising:

A. a circular support having
  1. at least one base portion between its inside and outside diameters;
  2. an outer raised annular ridge attached to and projecting from the base portion; and
  3. at least one circular outer attachment surface having a diameter greater than that of the innermost part of the outer raised annular ridge;

B. a circular recording medium film held in radial tension across and out of contact with the base portion, being supported by the outer raised annular ridge and adhered to the outer attachment surface of the support;

C. by a cured adhesive selected from the group consisting of acrylate and methacrylate functional adhesives (e.g. hydantoin hexacrylate) which are curable by ionizing radiation and which have a shear strength effective to maintain the radial tension of the annular recording medium film.

The term "outermost", as used herein, means closest to the outside diameter of the support, and the term "innermost" means closest to the inside diameter of the support.

The term "ionizing radiation" as used herein means radiation which causes the formation of ions as exemplified by electron beam, x-ray, and cobalt-60 radiation, and it does not include ultraviolet or infrared radiation.

The term "radial tension" as used herein means tension stress pulling outwardly with substantially the same force along all radii of the annulus of the recording medium film. This type of stress is produced by stretching the film over a circular ring or hoop.

The term "adhesive" means a substance capable of holding two bodies in intimate interfacial contact such that mechanical force can be transferred across the interface, and the term "cured" means polymerized or cross-linked into a set, rigid condition.

The useful acrylate and methacrylate functional adhesives are known in the art of radiation curable polymers, see Komp, J.T. and Mattingly, G.S., *Radiation Processing*, K&M Publications, Louisville, Kentucky, 1976. Some useful classes of such materials are: acrylated epoxy resins, acrylated bis-phenol A resins, polyester acrylate resins, acrylated urethane resins, and alkyd acrylates.

Surprisingly, the application of electron beam radiation in conjunction with hydantoin hexacrylate has been able to meet the required conditions, actually curing the adhesive trapped within the confines of the recording medium film and the support without damaging or in any known way lessening the usefulness of the product. There are no blisters, holes or gaps in the bond area. The bond can be fully cured with no damp, uncured or rough spots, and the recording medium film is completely sealed to the support. Creep between the recording medium film and the support is also substantially avoided by the bond. In addition, no heat (which might cause warping) is required in the bonding process, and no solvent is required, eliminating solvent odors and any need for solvent recovery. Samples of the inventive SSR have survived environmental testing retaining full utility.

BRIEF DESCRIPTION OF THE DRAWINGS

FIG. 1 is a perspective, cut-away view of an SSR of this invention.

FIG. 2 is a cross-sectional view of the SSR of FIG. 1.

DETAILED DESCRIPTION

Figure 3:
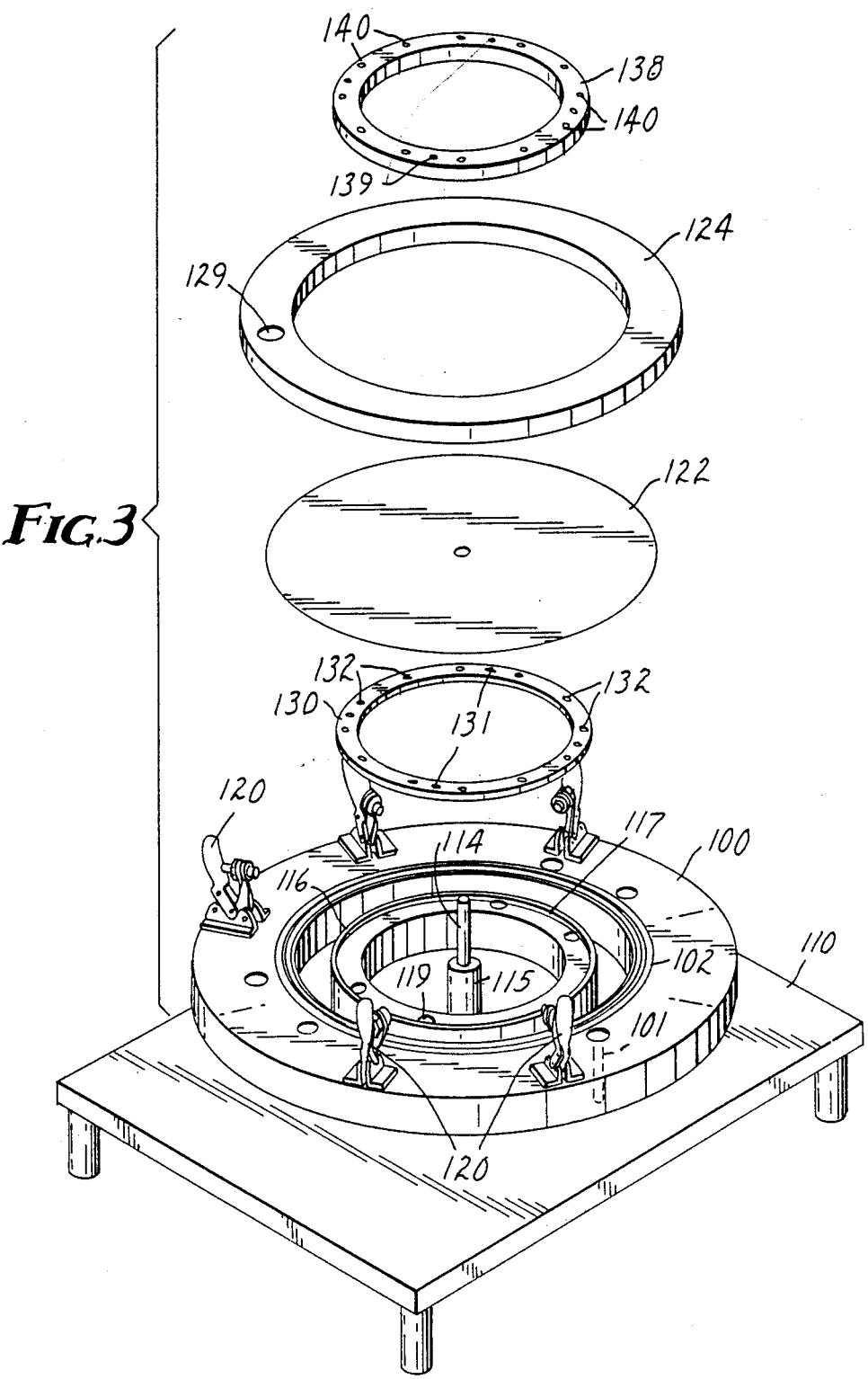
FIG. 3 is an exploded view of a stretching apparatus used for placing the recording medium film in radial tension before it is adhered to the support.

Preferably, SSR have the following additional features:

(a) the circular support and circular recording medium film are both annular in shape;

(b) the annular support further comprises an inner raised annular ridge attached to and projecting from the base portion and a circular inner attachment surface having a diameter smaller than that of the outermost part of the inner raised annular ridge; and (c) the annular recording medium film is also adhered to the inner attachment surface.

Referring to FIGS. 1 and 2 the SSR, generally indicated as 10, has annular support 12 with outer and inner raised annular ridges 28 and 42, respectively. The base portion 24 of support 12, together with such ridges, defines an annular depression in the support over which the recording medium films 14 and 16 are stretched. The annular support is made of a non-magnetic material which is dimensionally stable, rigid, and has a coefficient of thermal expansion close to that of aluminum, since many drives are designed for aluminum disks.

The annular support can be made of aluminum itself, or of thermosetting or thermoplastic resin. It is typically made of an injection molded, filled polymeric material such as polysulfone, polyphenylene sulfide, polyester, polyetherimide, acrylonitrile-butadiene-styrene, polystyrene polyamide (nylon) or polycarbonate resins filled with such materials as glass beads, fiber glass and mica (e.g., 20 weight percent fiberglass and 20 weight percent mica and 60 percent polymer resin).

The base portion of the support may be a flat area joining the first and second raised annular ridges or spokes which join these ridges. The support with spokes, instead of a solid continuous base portion may be more difficult to manufacture and possibly less dimensionally stable.

The recording media films 14 and 16 can be webs of any material which is useful for recording media and which can be held in radial tension. Typically, such recording medium film would comprise a substrate on which is coated a pigment/binder recording medium, or other type of recording medium magnetizable layer such as thin metal film. The substrate should have: dimensional stability, the feasibility of being stretched, smooth surface, and the potential for being well adhered to the support material (possibly with the aid of priming). Polyester (polyethylene terephthalate) and polyimide are possible substrate materials for magnetic media. It could be biaxially oriented polyester film or cast film. Other layers known to those skilled in the recording media art (e.g. subbing layers or lubricant layers) may comprise part of the recording medium film.

The polyethylene terephthalate commonly used as a substrate for magnetic recording media has a relatively low adhesion to most adhesives which can be cured with an electron beam. One method used to overcome this is to prime the back of the polyethylene terephthalate (i.e. the side to be adhered to the support 12) with a priming solution to enhance adherence. The following priming solutions have been used: solutions of 5 to 20 percent hydantoin hexacrylate plus 0.1 to 0.4 percent Irgacure 651 photoinitiator (made by Ciba Geigy Co.) in methylethylketone, 20 to 100 percent N,N-dimethylacrylamide in methyl ethyl ketone solvent; 95% N,N-dimethylacrylamide plus 5% HNO$_3$ in n-butanol; 95% N,N-dimethylacrylamide plus 5% dichlorohexane; and a mixture of 95% N,N-dimethylacrylamide and 5% dichloroethane. Such primers could be coated by rotogravure technique or sprayed onto the back of the polyester film at a thickness of about 0.1 to 0.2 micrometers and cured or partially cured by ultraviolet light. The primer solution should be well mixed, and fresh primer should be prepared immediately before use. Priming could be performed as part of a continuous process for extruding, calendering and orienting the polyester film.

The recording media films 14 and 16 typically have a thickness of about 5 to 200 micrometers. It is the unsupported portion of the recording media films 14 and 16 in between the two raised annular ridges which provides a deformable, resilient surface used to record signals from a transducer, such as a magnetic recording head.

The outer raised annular ridge 28 terminates in a reference surface 32 which supports recording medium film 14 and determines the spacing between the film and the surface of the intermediate portion. The outer attachment surface 36 comprises a curved surface joining the outside periphery 30 of the support 12 to the outer raised annular ridge 28. An adhesive groove 40 is provided in the first raised annular ridge and is provided to intercept any adhesive which may be forced from the attachment surface 36 by the film 14 and prevent such adhesive from reaching the outer reference surface 32

(possibly interfering with contact between the film and the outer reference surface).

Adjacent the inner diameter 22 of the support 12, is the second raised annular ridge 42 which, like the first raised annular ridge 28, terminates in an inner reference surface 44 spaced above the surface of the intermediate portion 24. The distance of this spacing is about equal to the spacing of the outer reference surface 32 above the surface of the intermediate portion. Inner attachment surface 48, to which the inside diameter 18 of the recording medium film 14 is adhered, comprises a curve joining relief groove 60 in the support with the inner raised annular ridge 42. Adhesive groove 52, located in the second raised annular ridge, is analogous to adhesive groove 40.

The first and second raised annular ridges 28 and 42 could have cross sectional shapes other than those shown in FIG. 2. For example, the ridges could be triangular in cross section with a rounded apex. The apex would provide a reference surface for the recording media films 14 and 16 and a fulcrum around which the films could be drawn.

Because the support 12, when made from polysulfone, polyphenylenesulfide or polyetherimide, generally has a low adhesion surface to most adhesives cured by electron beam, the inner and outer attachment surfaces 36 and 48 are coated with a primer. The following primers have been used: a 2 to 5 weight percent solution of hydantoin hexacrylate in methylethylketone with a photoinitiator, pure N,N-dimethylacrylamide, or cyanoacrylate adhesive coated onto the support and dried at room temperature. Both the hydantoin hexacrylate and dimethylacrylamide primers are exposed to ultraviolet light. These primers enhance the adhesion between the support and the adhesives which are curable by electron beam.

Because the recording media films 14 and 16 are so well sealed to both the inner and outer raised annular ridges, changes in atmospheric pressure can cause the air trapped between the support and the recording medium films to expand or contract which causes either a bulge or depression in the stretched surface of the recording media films. A small hole can be made in the surface of the films 14 and 16 near the inner raised annular ridge in order to equalize inside and outside air pressure.

In order to make the SSR as described above, it was necessary to develop a method and apparatus which would do the following:

(1) allow stretching the recording medium film on both sides of the support at the same time while adhering the film to the support;

(2) impose no distortion on the support itself;

(3) hold the recording medium film against both the inner and outer attachment surfaces at the same time; and (4) allow control over tension on the recording medium film.

In addition, the dimensions of the stretching fixture developed should be small enough to fit conveniently within commercially available electron beam apparatus. The stretching apparatus, subassemblies and fixture shown in FIGS. 3-6 meet these criteria.

Figure 4:
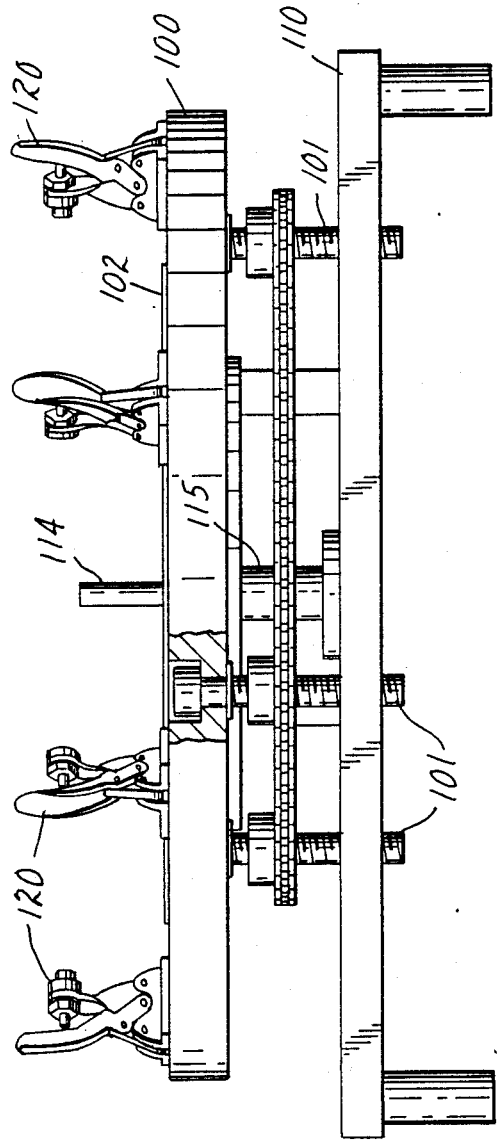
FIG. 4 is an elevation view of the stretching apparatus of FIG. 3.

The stretching apparatus, in the embodiment shown in FIGS. 3 and 4, basically comprises two sets of rings, one set for securely clamping a recording medium sheet 122 and the other for holding lower mounting ring 130 in place while the recording medium is stretched over it. The rings which are used for clamping the recording medium sheet are the base ring 100 and the holding ring 124. The base ring is supported upon platform 110 by base ring supports 101. Also supported upon the platform 110 are medium locator 115 and stationary ring 116 which can be conveniently supported on three or more posts from the platform. There may be locator pins (not shown) which protrude through locator holes 119 in the stationary ring and 131 in the lower mounting ring for purposes of maintaining the correct alignment of the various rings.

Lower mounting rinq 130 is placed on stationary ring 116 with the locator holes 119 and 131 aligned. Ridge 117 on the stationary ring 116 helps to center the lower mounting ring 130.

The primed recording medium sheet 122 having a central hole is located on top of the base ring by inserting the medium locator pin 114 through the hole in the recording medium sheet and laying the sheet flat. Holding ring 124 is then placed on top of the recording medium sheet, and a plurality of clamping means (such as toggle clamps) 120 are used to press the holding ring 124 tightly against the base ring 100. The base ring gasket 102 in combination with serrations on the bottom side of the holding ring 124 help to hold the recording medium sheet tightly between the holding ring and the base ring 100.

The base ring 100 is movable upward and downward through lowering means. The lowering means may be any means known to those skilled in the art for lowering a planar device so that all points on the plane move downward at the same rate. In one embodiment, this lowering means comprises using three screws as the base ring supports 101, said screws fitting into threaded holes in the platform 110 and also having sprockets located at the same height on each screw, said sprockets being interconnected by a chain (such as roller chains known for use with chain and sprocket drives). To lower the base ring, the operator inserts a screwdriver through hole 129 in the holding ring to engage one of the three screws, and by turning the screw, he automatically turns the other two screws through the chain and sprocket mechanism lowering the base plate at an even rate. This motion stretches the recording medium sheet 122 over the lower mounting ring 130 resting on stationary ring 116.

The degree of stretching of the recording medium sheet can be controlled through the lowering means and measured by measuring the grams force needed to achieve a given amount of deformation of the stretched film, for example, grams per 25 micrometers of downward deformation of the stretched sheet. This measurement is made so that the degree of stretching can be made the same for both sides of the SSR.

The upper mounting ring 138 is placed over the stretched recording medium sheet and located by inserting the locator pins through its locator holes 139. Next, the lower and upper mounting rings are securely attached to each other by mechanical clamping means. In the embodiment shown, the mechanical clamping means comprises a number of screw holes 132 in the lower mounting!ring and 140 in the upper mounting ring and screws 145 which are threaded through said screw holes (incidentally, punching holes through the recording medium sheet 122) and tightened securely. There are serrations on the mating surface of the lower mounting ring which, in conjunction with a thin rubber gasket 134 in the upper mounting ring 138, help to grip the recording medium sheet which is in radial tension. The upper and lower mounting rings 138 and 130 and mating ring 133 are usually made of stainless steel, and the rings of the stretching apparatus are typically made of aluminum.

propyl]-5,5-dimethyl-2, 4-imidizolidinedione has the formula

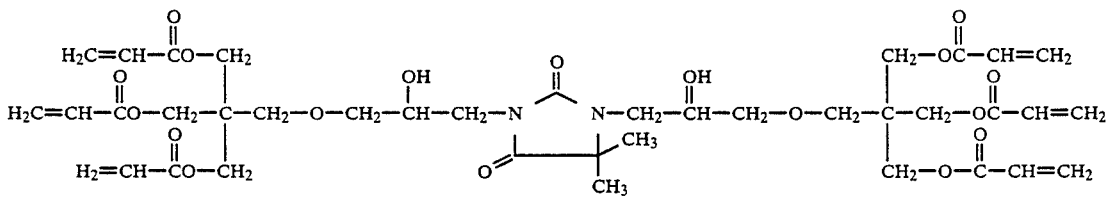

With the recording medium sheet held securely between the upper and lower mounting rings 130 and 138, the excess recording medium sheet material beyond the outside diameter of the upper mounting ring can be trimmed away, and the mounting rings are lifted away from the stretching apparatus. The combination of the stretched recording medium held between the upper and lower mounting rings is referred to as the upper subassembly 160.

Figure 6:
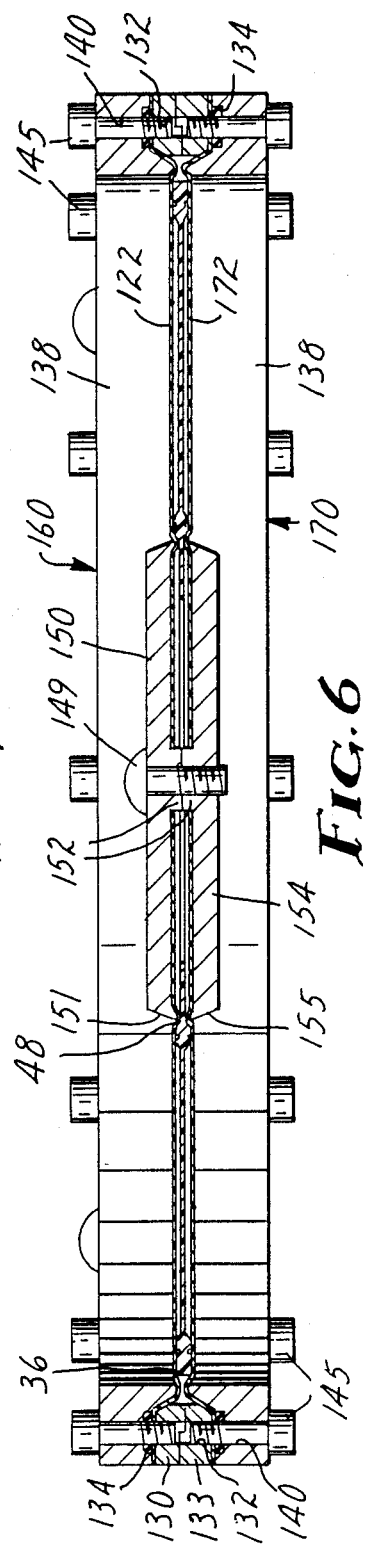
FIG. 6 is a sectional view of the stretching fixture of FIG. 5.
Figure 5:
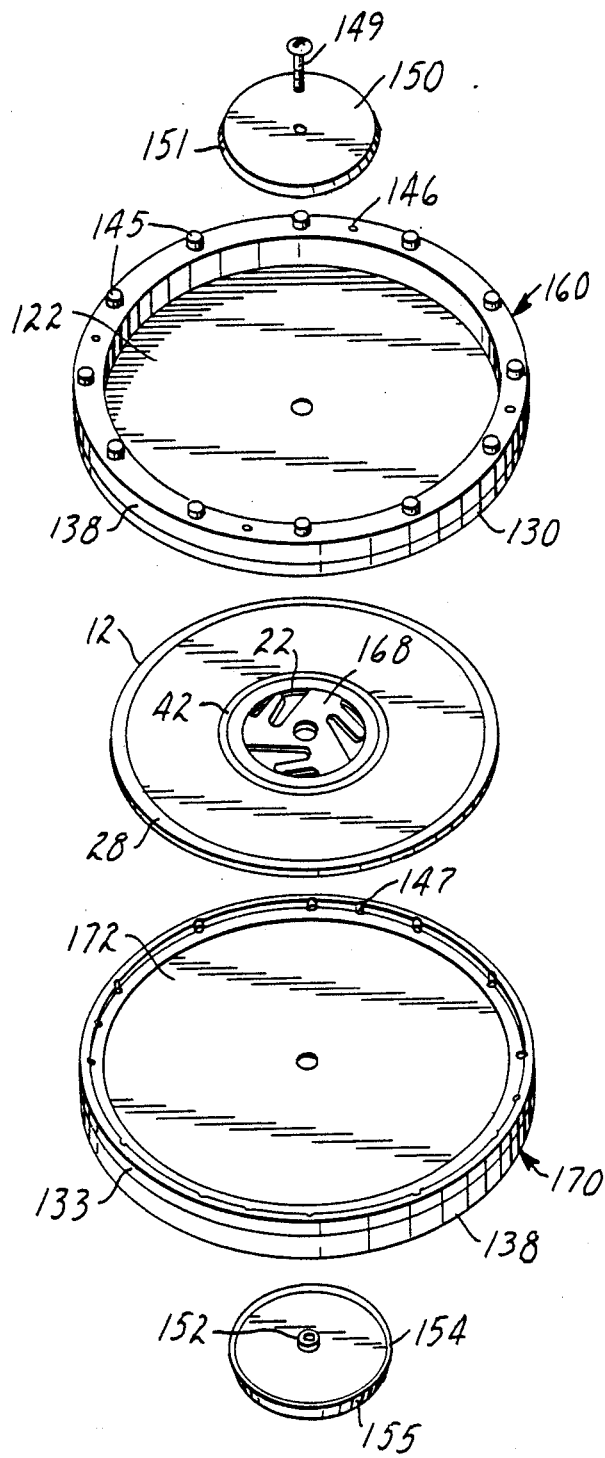
FIG. 5 is an exploded view of a stretching fixture by means of which the components of the SSR are assembled prior to exposure to the electron beam.

The lower subassembly 170 is assembled in a similar fashion except that mating ring 133 is used instead of the lower mounting ring described above. Mating ring 133 also has serrations on the surface facing the recording medium sheet 172. The sides of the lower mounting ring 130 and the mating ring 133 which are away from their respective recording media sheets are designed to mate with each other, as shown in FIG. 6, to aid in aligning the two subassemblies over the support.

Biaxially oriented polyester is felt to have inherent anisotropy because of the stretching it undergoes in the machine direction (direction in which film exits the extruder) and in the transverse direction (90° to the machine direction). Therefore, it is preferred to assemble the stretching fixture so that this anisotropy is in the same orientation on both sides of the SSR (i.e., machine direction of the polyester substrate on top is in alignment with that on the bottom of the double sided SSR). For this purpose marks are placed on the base ring 100, holding ring 124, mounting ring 130, mating ring 133, and upper mounting rings 138. By orienting the film in the same way relative to the stretching apparatus; aligning the marks on the base ring, holding ring, and the mounting and mating rings of the subassemblies 160 and 170, the film anisotropy on one side will be approximately in register with that on the other side.

The raised annular ridges of support 12 are burnished by moving circularly over an abrasive lapping film.

Ideally, the assembly steps described hereafter are done in a clean room environment in which atmospheric contaminants such as dust and other particulates are removed from the air. The stretched film in the subassembly is next annealed at about 166° C. for about three minutes.

The support 12 is inserted into the vapor zone above the boiling solvent sump of an ultrasonic vapor degreaser for about one minute for cleaning. Then, the electron beam curable adhesive (e.g. 50% hydantoin hexacrylate/ 50% dimethyl acrylamide) is applied in a thin layer to the inner and outer attachment surfaces 48 and 36.

Hydantoin hexacrylate, otherwise known as 1,3-Bis3[2,2,2-(triacryloyloxymethyl)ethoxy 2-hydroxypropyl]-5,5-dimethyl-2, 4-imidizolidinedione has the formula The preparation of this compound is given in U.S. Pat. No. 4,249,011. Since the viscosity of pure hydantoin hexacrylate is rather high (over about 10,000 centipoise at room temperature) it is a feature of this invention to mix the e-beam curable adhesive (e.g., hydantoin hexacrylate) with another compound (or a minor amount of fugitive, non-reactive solvent) of lower viscosity which is compatible with the goal of adhesively bonding the recording medium film to the support. By being compatible, it is meant that the additive material is not detrimental to the adhesive bond although it may be inert. Preferably, the additive material, besides lowering viscosity, contributes to the adhesive bond by being an adhesive or a cross-linking agent itself. N,N-dimethylacrylamide is a suitable additive for such purposes. This material lowers the viscosity of the resulting mixture below that of pure hydantoin hexacrylate, enabling the application of a very thin, uniform film of adhesive to the bonding areas at the periphery of the annular support. A suitable adhesive mixture should have a Brookfield viscosity between about 5 and 5000 centipoise (cps) preferably between 10 and 500 cps. For N,N-dimethylacrylamide/hydantoin hexacrylate mixtures, this implies a mixture comprising about 10 to 90 weight percent (preferably 30 to 80 weight percent) hydantoin hexacrylate, the rest being N,N-dimethylacrylamide. Other compatible additives are: methacrylates such as 2-(1-aziridinyl)ethylmethacrylate or allyl methacrylate; acrylates such as glycidylacrylate; diacrylates such as 1,6-hexanediol diacrylate; and N-vinyl-2-pyrrolidone.

In the case of double-sided 4-inch (10 cm) diameter SSR, about 20 milligrams of adhesive are applied to each support. It is desirable to minimize the thickness of the layer of adhesive applied to the bonding surfaces, but good bonding has been obtained with layers as thick as about 13 micrometers.

The side of the stretched recording medium film in each subassembly which will face the support 12 is wiped with alcohol and blown clean with ionized air. Next, the lower subassembly 170 is placed on lower hub 154; the support 12 is centered on the lower subassembly; upper subassembly 160 is placed over the support and lower subassembly; and the upper hub 150 is centered on the recording medium sheet 122. The upper and lower subassemblies may be clamped together by any convenient clamping means. In the embodiment illustrated, this comprises a plurality of screw holes 146 and 147, in the upper and lower subassemblies respectively, which are threaded to receive screws (not shown) for securing the two subassemblies to each other. Screw 149 is also inserted through the central hole in hub 150 and is threaded into the central hole in the lower hub 154. The outside diameter of hubs 150 and 154 is slightly less than the diameter of the inner attachment surface 48, and as the central screw 49 is tightened, the edges of the hubs are drawn into relief groove 60, consequently forcing the recording media sheets 122 and 172 into close contact with the inner attachment surface.

It has been found helpful to place a temporary insert disk 168 fitting snugly within the inside diameter 22 of the support before it is placed in between the two subassemblies. Such a temporary insert would have a central hole with a diameter just slightly larger than the diameter of central collars 152 on the hubs, so that the hubs 150 and 154 would be located exactly at the center. This temporary insert would be removed later after the electron beam process.

The completely assembled SSR stretching fixture shown in FIG. 6 is exposed to an electron beam (e-beam). One e-beam apparatus useful for this step is an Electro-Curtain ® machine manufactured by Energy Sciences Inc. in Woburn, Massachusetts. The SSR stretching fixture is placed in a rectangular tray which is placed on a conveyor belt which in turn travels through the electron beam apparatus. In a matter of seconds, the SSR stretching fixture traverses through the electron beam curing chamber, which is preferably maintained in an inert atmosphere (e.g. flushed with nitrogen) having less than 60 ppm oxygen. The e-beam apparatus is typically operated at 175 kv and a current of 6.7mA when conveying speed is about 12 meters per minute or about 3.3 milliamperes when the conveying speed through the curing chamber is about 6 meters per minute. The intensity of each exposure of the SSR stretching fixture to an electron beam is no more than about 10MRad. After the SSR stretching fixture has been exposed to the electron beam on one side, it is then exposed in a similar manner on the opposite side for double-sided SSR.

For purposes of the e-beam process, hubs 150 and 154 have bevels, 151 and 155 respectively, to ensure that the inner attachment surface 48 is actually exposed to the electron beam. As can be seen from FIG. 6, the outer attachment surface 36 is also left accessible to the electron beam, since the upper and lower suhassemblies 160 and 170 actually have inside diameters larger than that of the outer attachment surface 36. The electron beam can penetrate the polymeric material as well as the magnetic layer (e.g., iron oxide pigment/binder or CoCr thin metal layer) of the recording media sheets 122 and 172, but it cannot penetrate the metal of the subassemblies or hub. Thus, it is important that the bond areas not be obstructed by metal.

After e-beam curing on both sides of the SSR, the hubs 150 and 154 can be removed by removing the screw 149. Then, the portions of recording media sheets 122 and 172 in the center can be removed by cutting it out, being careful not to cut into the inner attachment surface 48. Excess adhesive should be wiped off the support with cotton and alcohol; and the fixture may be exposed again to the e-beam on both sides to cure any remaining excess adhesive exposed after removal of the hubs. The purpose of wiping the adhesive from the support is to avoid the presence of cured adhesive on the inside diameter portion of the support, the area which would be clamped onto a drive hub. Dried adhesive on that area can adversely affect operation of the SSR.

At this point, the upper and lower subassemblies 160 and 170 can be disassembled, and any excess recording media film beyond the outside diameter of the SSR support can be cut away.

The bonds between the recording media films 14 and 16 and the support 12, in a properly cured SSR, are so strong that when a test strip of the recording medium film is peeled away from the support at 90° to the surface of the support in a tensile strength tester (Instron machine) the polyester substrate of the recording medium fails before the bond itself.

The properties, such as tensile strength of the adhesive bond, of an SSR depend on the type and amount of adhesive and on the parameters of the electron beam irradiation process (e.g. dosage, voltage, and density of product) and will be different for each material used. However, those skilled in the art of e-beam processes are able to make the necessary adjustments to obtain required bond strength with a minimum amount of experimentation.

The curing of electron beam curable adhesives is very fast. SSR have been passed through the e-beam apparatus at a rate of about 40 disks per minute implying a curing time of close to one second. On the other hand, cyanoacrylate adhesive may be compounded for various setting times. The fast ones can set in one minute; however, such fast cure adhesives are not practical because it requires more than one minute to apply the adhesive to the inner and outer attachment surfaces of the support and assemble the stretching fixture as shown in FIG. 6. Such cyanoacrylate adhesives would set before the SSR had been assembled. Thus, the cyanoacrylates actually used before the advent of the e-beam process herein described were compounded to have a curing time of about four to six hours. Thus, the time necessary to manufacture an SSR with the e-beam curing process is much less than the time required with cyanoacrylate adhesives.

In addition, the process yield of good product has improved using the inventive process. Out of a total of 452 SSR made using basically the same stretching and assembly process as described above, with the exception that there was no priming and cyanoacrylate was used instead of an e-beam curable adhesive, the yield of good product was only 75 percent. 25 percent of such SSR were unsatisfactory for various reasons, all related to the adhesive, such as: spots along the attachment surfaces which were not bonded; uncured spots; and rough spot at the inner or outer raised annular ridge. On the other hand, 860 SSR have been bonded by the inventive e-beam process, and the yield has been nearly 100%.

In the shear mode, cyanoacrylate adhesive is strong enough, when properly cured, to bond SSR. However, this bonding is weak in a peel mode. It is possible to peel the recording medium film bonded with cyanoacrylate away from the attachment surfaces without much effort. Even though the bonds of an SSR are normally under shear stress, handling of SSR may subject the bonds to peel stress. An attempt to measure the 180° peel force of a cyanoacrylate SSR bond could not obtain any meaningful reading because of the very low peel force required. On the other hand, the e-beam cured adhesive bond of the present invention provides a very strong bond between the support 12 and the annular recording medium film 14 in both the shear and peel modes. In both the shear and peel tests, failures of sample specimens have occurred within the polyester of the recording medium (about 38 micrometers thick) rather than in the adhesive bond.

Such adhesion tests of two 4" (10cm) diameter SSR of this invention are described below. Sample SSR were cut radially into six equal sectors. For each individual sector being tested for bond strength at the outer attachment surface, about two thirds of the support was then cut away from the inside portion, leaving the portion nearest the outside diameter intact. Some of the recording medium film was cut and removed in order to form a radial strip of the film, one end being loose and the other being attached to the outer attachment surface at about the middle of the sector, giving a sample which looked somewhat T-shaped (the support portion forming the cross member of the T). Samples for testing shear strength of the bond at the inner attachment surface of the SSR were prepared in a similar manner to the outside diameter specimens just described, except that the portion of the support remaining intact in each sector sample was nearest the inside diameter, a portion of the support closest to the outside diameter having been removed. The support portion was clamped in one jaw of an Instron tensile strength tester (using a metal piece having a groove bridging the bond area on the bond side so that the bond itself would not be clamped) and the recording medium film strip was clamped in the other jaw. Cross head speed of the Instron tester was set at about 0.2 inch per minute (0.5 cm/min.). The results of shear tests of such samples are indicated in Table 1 below.

TABLE 1

| Shear strength of adhesive joints | |
|---|---|
| Average Shear (kg/cm*) | |
| Hydantoin Hexacrylate e-beam bond | Cyanoacrylate bond |
| Outside Diameter 5.8 | 6.2 |
| Inside Diameter 5.4 | 1.1 |

*centimeters width of the recording medium strip bonded to the support.

In each case for outside diameter testing, the polyester recording medium film failed before the adhesive bond; whereas, for the inside diameter, the mode of failure was mixed sometimes being due to bond failure and sometimes due to failure of the polyester. The SSR of this invention have been submerged in boiling water for at least 2 ½ hours without the recording medium film coming loose from the support.

The following additional acrylated, e-beam curable adhesive resins have been tested for shear strength with similar good results: acrylated epoxies - such as Celrad 3701 resin made by Celanese Corp. and Ebecryl 19-6600 resin by Radcure Specialties, Inc. of Port Washington, Wisconsin; acrylated bisphenol A - Chempol 19-6001 monomer by Radcure Specialties, Inc. and acrylated urethanes - Chempol 19-4828 and Chempol 19-4833 resins by Radcure Specialties, Inc.

The structures of some useful acrylated e-beam curable adhesives are:

diacrylate or dimethacrylate esters of Bis-phenol A (e.g., Chempol 19-6001 type monomers)

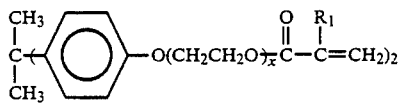

wherein X is an integer from 1 to 3 and $R_1$ is -H or $CH_3$.

diacrylate or methacrylate esters of a bis-phenol A epoxy resin (e.g., Ebecryl 19-6600 type or Celrad 3700 series type resins)

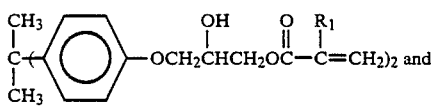

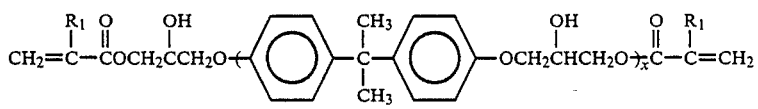

Whereas the older cyanoacrylate bonded SSR had loose spots from time to time along the attachment surfaces, the e-beam bonded SSR of this invention have a smooth and uniform bonding surface. Because of the superior bond formed by the inventive process, the bonding area can actually be reduced over the area which had been used for cyanoacrylate adhesives, thus making more area available for recording.

Other embodiments of this invention will be apparent to those skilled in the art from a consideration of this specification or practice of the invention disclosed herein. Various omissions, modifications and changes to the principles described herein may be made by one skilled in the art without departing from the true scope and spirit of the invention which is indicated by the following claims.

I claim:

1. A method for making a stretched surface recording disk comprising at least one circular recording medium film which is concentric with and bonded in radial tension to an annular support, which method comprises the following steps:

(A) providing:
  (1) an annular support having
    (a) at least one base portion between its inside and outside diameters;
    (b) an outer raised annular ridge attached to and projecting from the base portion; and
    (c) at least one circular outer attachment surface located at or near the outer circumference of the annular support and having a diameter greater than that of the innermost part of the outer raised annular ridge; and
  (2) a polymeric sheet which will be the substrate of the annular recording medium film;

(B) applying to the outer attachment surface of the annular support an adhesive selected from the group consisting of acrylate and methacrylate functional adhesives which are curable by ionizing radiation and which, when cured, have a shear strength effective to maintain radial tension in the circular recording medium film of the finished product;

(C) adhering the annular support to the polymeric sheet by
  (1) placing the polymeric sheet in contact with the outer attachment surface of the annular support in a manner such that the attachment surface is accessible to ionizing radiation while, at the same time, imposing radial tension on the polymeric sheet, and
  (2) curing the adhesive by exposing it to ionizing radiation.

2. The method of claim 1 wherein the adhesive of step (B) is selected from the group consisting of: acrylated epoxy resins, acrylated bis-phenol A resins, acrylated urethane resins, polyester acrylate resins, and alkyd acrylates.

3. The method of claim 2 wherein:
  the annular support has an inner raised annular ridge attached to and projecting from the base portion, nearer to its inside diameter than the outer raised annular ridge, and a circular inner attachment surface having a diameter smaller than the outermost part of the inner raised annular ridge;
  the annular support has such inner and outer raised annular ridges on both sides;
  two polymeric sheets are provided;
  the adhesive in step (B) is applied to both the inner and outer attachment surfaces of the annular support on both sides of the annular support; and
  in step (C), the two polymeric sheets are adhered to the annular support, one on either side, by contacting each polymeric sheet with both the inner and outer attachment surfaces on a side of the annular support and exposing the adhesive to ionizing radiation, in order to produce a stretched surface recording disk having recording medium film on both sides of the disk.

* * * * *

UNITED STATES PATENT AND TRADEMARK OFFICE
CERTIFICATE OF CORRECTION

PATENT NO. : 4,963,209

DATED : October 16, 1990

INVENTOR(S) : Chernega et al.

It is certified that error appears in the above-identified patent and that said Letters Patent is hereby corrected as shown below:

Col. 6, line 12  "rinq" should read --ring--

Col. 6, line 62  "mounting!ring" should read --mounting ring--

Col. 9, line 41  "suhassemblies" should read --subassemblies--

Col. 10, line 45 "spot" should read --spots--

Col. 12, line 43 "I claim" should read --What is Claimed is:--

Signed and Sealed this

Fifth Day of May, 1992

Attest:

DOUGLAS B. COMER

*Attesting Officer*    *Acting Commissioner of Patents and Trademarks*